(12) United States Patent
Sharma et al.

(10) Patent No.: US 9,853,722 B1
(45) Date of Patent: Dec. 26, 2017

(54) SYSTEMS AND METHODS FOR PATH PROTECTION SWITCHING DUE TO CLIENT PROTECTION SWITCHING

(71) Applicant: Ciena Corporation, Hanover, MD (US)

(72) Inventors: Atul Sharma, Gurgaon (IN); Jatin Sareen, New Delhi (IN)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/223,324

(22) Filed: Jul. 29, 2016

(30) Foreign Application Priority Data

Jun. 17, 2016 (IN) .............................. 201611020808

(51) Int. Cl.
    *H04B 10/032* (2013.01)
    *H04B 10/079* (2013.01)
    *H04Q 11/00* (2006.01)
    *H04B 10/27* (2013.01)

(52) U.S. Cl.
    CPC ....... *H04B 10/032* (2013.01); *H04B 10/0791* (2013.01); *H04B 10/0795* (2013.01); *H04B 10/27* (2013.01); *H04Q 11/0005* (2013.01); *H04Q 11/0062* (2013.01); *H04Q 2011/0043* (2013.01); *H04Q 2011/0081* (2013.01)

(58) Field of Classification Search
    None
    See application file for complete search history.

(56) References Cited

U.S. PATENT DOCUMENTS

| 7,143,161 | B2 | 11/2006 | Brissette |
| 8,417,111 | B2 | 4/2013 | Moynihan et al. |
| 8,774,232 | B2 | 7/2014 | Smith et al. |
| 9,088,380 | B2 | 7/2015 | Ibach et al. |
| 9,143,227 | B2 | 9/2015 | Moynihan et al. |
| 2009/0175618 | A1 | 7/2009 | Yan |
| 2011/0262128 | A1 | 10/2011 | Madrahalli et al. |
| 2014/0169783 | A1 | 6/2014 | Surek |
| 2014/0186019 | A1* | 7/2014 | Chaudhary .......... H04B 10/032 398/1 |

(Continued)

OTHER PUBLICATIONS

A. Doria et al., General Switch Management Protocol (GSMP) Applicability, Informational Memo, pp. 1-9, The Internet Society, Jun. 2002.

(Continued)

*Primary Examiner* — Darren E Wolf
(74) *Attorney, Agent, or Firm* — Clements Bernard Walker PLLC; Christopher L. Bernard; Lawrence A. Baratta, Jr.

(57) ABSTRACT

A method to avoid sympathetic switches in path switching protection due to client protection switching includes monitoring a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node; responsive to detecting defects in both the drop side TCM entity and the line side TCM entity on a working line, implementing path protection switching of the working line; and, responsive to detecting defects only in the drop side TCM entity, implementing path protection switching of the working line responsive to persistence of the defects.

20 Claims, 7 Drawing Sheets

(56) References Cited

U.S. PATENT DOCUMENTS

2016/0043797 A1    2/2016  Sareen et al.

OTHER PUBLICATIONS

E. Mannie, Generalized Multi-Protocol Label Switching (GMPLS) Architecture, Standards Track, pp. 1-69, The Internet Society, Oct. 2004.

A. Doria et al., Forwarding and Control Element Separation (ForCES) Protocol Specification, Internet Standards Track Document, Internet Engineering Task Force, pp. 1-124, Mar. 2010.

ITU-T G.709/Y.1331, Telecommunication Standardization Sector of ITU, Interfaces for the optical ransport network, pp. 1-238, Feb. 2012.

ITU-T G.798, Telecommunication Standardization Sector of ITU, Characteristics of optical transport network hierarchy equipment functional blocks, pp. 1-390, Dec. 2012.

ITU-T G.805, Telecommunication Standardization Sector of ITU, Generic functional architecture of transport networks, pp. 1-58, Mar. 2000.

ITU-T G.872, Telecommunication Standardization Sector of ITU, Architecture of optical transport networks, pp. 1-52, Oct. 2012.

ITU-T G.873.1, Telecommunication Standardization Sector of ITU, Optical transport network (OTN): Linear protection, pp. 1-36, May 2014.

ITU-T G.8732, Telecommunication Standardization Sector of ITU, ODUk shared ring protection, pp. 1-108, Aug. 2015.

ITU-T G.77132/Y.1704.2, Telecommunication Standardization Sector of ITU, Distributed Call and Connection Management: Signalling mechanism using GMPLS RSVP-TE, pp. 1-46, Mar. 2003.

ITU-T G.7714.1/Y.1705.1, Telecommunication Standardization Sector of ITU, Protocol for automatic discovery in transport networks, pp. 1-46, Jan. 2015.

ITU-T G.8080/Y.1304, Telecommunication Standardization Sector of ITU, Architecture for the automatically switched optical network, pp. 1-124, Feb. 2012.

* cited by examiner

US 9,853,722 B1

SYSTEMS AND METHODS FOR PATH PROTECTION SWITCHING DUE TO CLIENT PROTECTION SWITCHING

CROSS-REFERENCE TO RELATED APPLICATION(S)

The present patent application/patent claims the benefit of priority of Indian Patent Application No. 201611020808, filed on Jun. 17, 2016, and entitled "SYSTEMS AND METHODS FOR PATH PROTECTION SWITCHING DUE TO CLIENT PROTECTION SWITCHING," the contents of which are incorporated in full by reference herein.

FIELD OF THE DISCLOSURE

The present disclosure generally relates to optical networking systems and methods. More particularly, the present disclosure relates to systems and methods for path protection switching due to client protection switching such as in Optical Transport Network (OTN), Synchronous Optical Network (SONET), Synchronous Digital Hierarchy (SDH), Ethernet, etc.

BACKGROUND OF THE DISCLOSURE

Optical Transport Network (OTN) is a physical layer protocol (Layer 1) for Time Division Multiplexing (TDM) providing transport, multiplexing, switching, management, supervision, and protection/survivability of optical channels carrying client signals. OTN is defined inter alia in ITU-T Recommendation G.709 "Interfaces for the Optical Transport Network (OTN)," (02/12), the contents of which are incorporated by reference. With respect to protection, OTN deployments can support various techniques for path protection which switch OTN channels or lines responsive to a failure in the OTN network which affects the channels or lines. Path protection is dedicated protection in the OTN network with a working and a protection channel (also referred to as active and standby, primary and backup, or combinations thereof). One exemplary type of path protection is Subnetwork Connection Protection (SNCP). Thus, path protection can provide 1+1 Automatic Protection Switching (APS) protection of channels in the OTN network or a non-OTN network, on the line-side to protect against failures in the OTN network or the non-OTN network. Additionally, services can also include client-side protection such as 1+1 client protection which is meant to protect against failures on client-side modules or hand-offs from a client network. Those of ordinary skill in the art understand that path protection is also available in SONET, SDH, Ethernet, etc., and OTN is described herein for illustration purposes.

With both path protection in OTN and client-side protection on the associated clients, there is a scenario where a client-side switch, such as due to a failure of a client module or a fault in the client network, can lead to the detection of an anomaly in OTN causing path protection undesirably. This can be referred to as a sympathetic switch in OTN when client-side APS switches. Of course, this causes problems in traffic between client-side ports and OTN line ports. Conventional approaches to rectify this problem include implementing a hold-off time on the OTN side whenever there is a client-side switch. Disadvantageously, this can lead to protection switch times in excess of 100 ms, which is the exact opposite objective of path protection which strives for sub-50 ms protection switch times.

BRIEF SUMMARY OF THE DISCLOSURE

In an exemplary embodiment, a method, implemented in a node in a network, for avoiding sympathetic switches in path switching protection due to client protection switching includes monitoring a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node; responsive to detecting defects in both the drop side TCM entity and the line side TCM entity on a working line, implementing path protection switching of the working line; and, responsive to detecting defects only in the drop side TCM entity, implementing path protection switching of the working line responsive to persistence of the defects. The method can further include, responsive to detecting defects only in the drop side TCM entity, delaying path protection switching of the working line until the defects recover thereby indicating client protection switching which does not affect the connection. The method can further include, subsequent to the client protection switching, provisioning a new drop side TCM entity and preventing path protection switching until the new drop side TCM entity is established. The defects can be persistent after 10 ms. The drop side can include client protection switching via two client ports and the line side can include path protection switching, and wherein the drop side TCM entity and the line side TCM entity differentiate between switching events. The path protection switching can include Subnetwork Connection Protection (SNCP). The drop side TCM entity and the line side TCM entity can be established via control plane messaging. The persistence of the defects only in the drop side TCM entity indicates a switch fabric fault.

In another exemplary embodiment, an apparatus, disposed in a node in a network, to avoid sympathetic switches in path switching protection due to client protection switching in Optical Transport Network (OTN) includes circuitry adapted to monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node; circuitry adapted to cause, responsive to detection of defects in both the drop side TCM entity and the line side TCM entity on a working line, path protection switching of the working line; and circuitry adapted to cause, responsive to detection of defects only in the drop side TCM entity, path protection switching of the working line responsive to persistence of the defects. The apparatus can further include circuitry adapted to delay, responsive to detecting defects only in the drop side TCM entity, path protection switching of the working line until the defects recover thereby indicating client protection switching which does not affect the connection. The apparatus can further include circuitry adapted to provision, subsequent to the client protection switching, a new drop side TCM entity and prevent path protection switching until the new drop side TCM entity is established. The defects can be persistent after 10 ms. The drop side can include client protection switching via two client ports and the line side can include path protection switching, and wherein the drop side TCM entity and the line side TCM entity differentiate between switching events. The path protection switching can include Subnetwork Connection Protection (SNCP). The drop side TCM entity and the line side TCM entity can be established via control plane messaging. The persistence of the defects only in the drop side TCM entity indicates a switch fabric fault.

In a further exemplary embodiment, a node in a network adapted to avoid sympathetic switches in path switching protection due to client protection switching in Optical Transport Network (OTN) includes a plurality of ports communicatively coupled to a corresponding node; and a controller communicatively coupled to the plurality of ports and configured to monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node, responsive to detection of defects in both the drop side TCM entity and the line side TCM entity on a working line, cause path protection switching of the working line, and, responsive to detecting detection of only in the drop side TCM entity, cause path protection switching of the working line responsive to the defects persisting. The controller can be further configured to delay, responsive to detecting defects only in the drop side TCM entity, path protection switching of the working line until the defects recover thereby indicating client protection switching which does not affect the connection. The controller can be further configured to provision, subsequent to the client protection switching, a new drop side TCM entity and prevent path protection switching until the new drop side TCM entity is established. The drop side can include client protection switching via two client ports and the line side can include path protection switching, and wherein the drop side TCM entity and the line side TCM entity differentiate between switching events.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to systems and methods for path switching protection due to client protection switching in Optical Transport Network (OTN). Specifically, the systems and methods propose detecting the presence of client protection in a switch by using two separate Tandem Control Monitoring (TCM) layers to detect that path switching protection is vulnerable to client protection. In various exemplary embodiments, the systems and methods utilize the two separate TCMs to differentiate whether the line is good (no protection action), whether there is a transitory glitch due to client protection (no path switching protection), and whether there is a problem in the network necessitating path protection switching. The aforementioned approach avoids hold-off timers and provides path protection sub-50 ms as expected for linear path protection switching.

Exemplary Network

Figure 1:
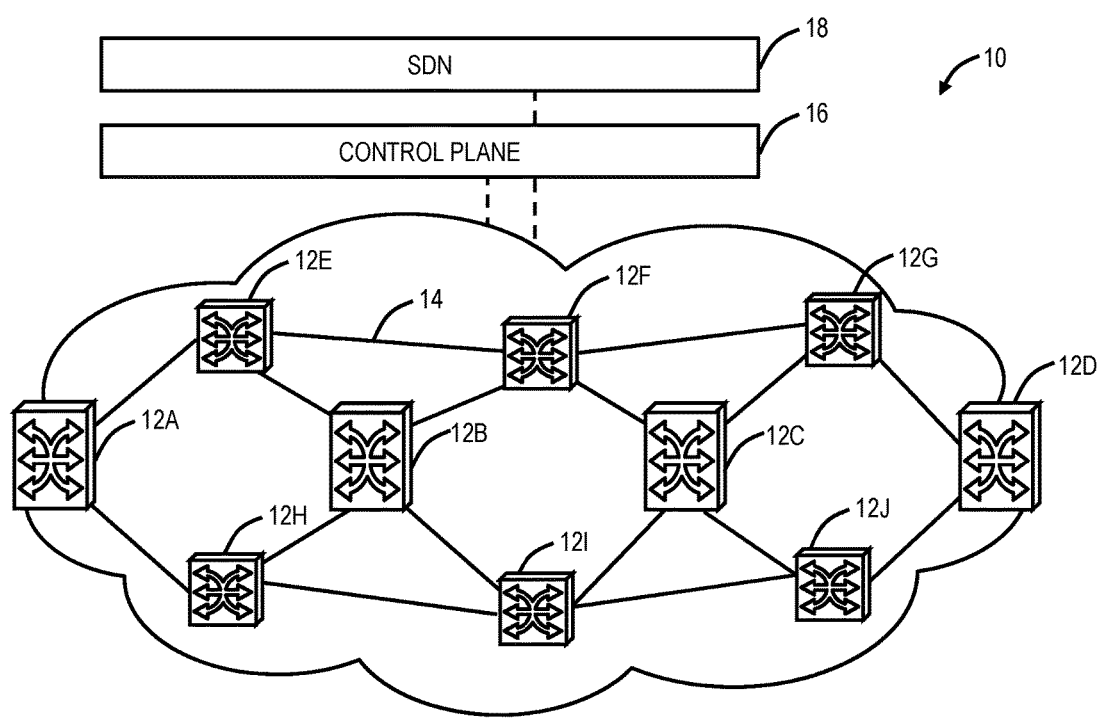
FIG. 1 is a network diagram of an exemplary network with various interconnected nodes.
Figure 2:
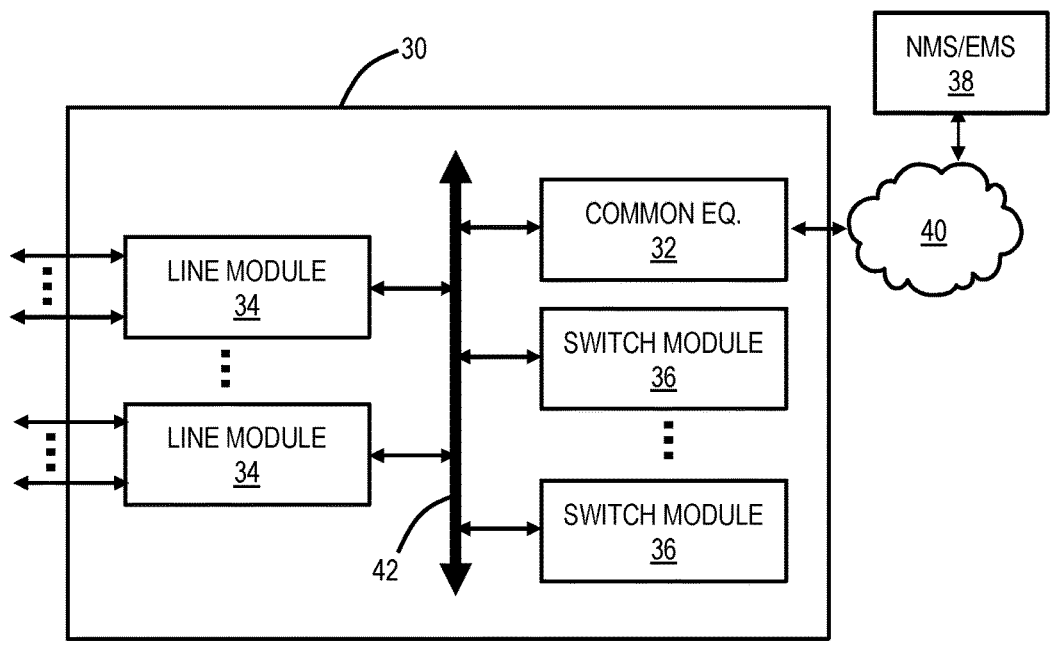
FIG. 2 is a block diagram of an exemplary node for use with the systems and methods described herein.

Referring to FIG. 1, in an exemplary embodiment, a network diagram illustrates an exemplary network 10 with various interconnected nodes 12 (illustrated as nodes 12A-12J). The nodes 12 are interconnected by a plurality of links 14. The nodes 12 communicate with one another over the links 14 through Layer 0 (L0) such as optical wavelengths (DWDM), Layer 1 (L1) such as OTN, Layer 2 (L2) such as Ethernet, MPLS, etc., Layer 3 (L3) protocols, and/or combinations thereof. The nodes 12 can be network elements which include a plurality of ingress and egress ports forming the links 14. An exemplary node implementation is illustrated in FIG. 2. The network 10 can include various services or calls between the nodes 12. Each service or call can be at any of the L0, L1, L2, and/or L3 protocols, such as a wavelength, a Subnetwork Connection (SNC), a Label Switched Path (LSP), etc., and each service or call is an end-to-end path or an end-to-end signaled path and from the view of the client signal contained therein, it is seen as a single network segment. The nodes 12 can also be referred to interchangeably as network elements (NEs). The network 10 is illustrated, for example, as an interconnected mesh network, and those of ordinary skill in the art will recognize the network 10 can include other architectures, with additional nodes 12 or with fewer nodes 12, etc. as well as with various different interconnection topologies and architectures.

The network 10 can include a control plane 16 operating on and/or between the nodes 12. The control plane 16 includes software, processes, algorithms, etc. that control configurable features of the network 10, such as automating discovery of the nodes 12, capacity on the links 14, port availability on the nodes 12, connectivity between ports; dissemination of topology and bandwidth information between the nodes 12; calculation and creation of paths for calls or services; network level protection and restoration; and the like. In an exemplary embodiment, the control plane 16 can utilize Automatically Switched Optical Network (ASON) as defined in G.8080/Y.1304, Architecture for the automatically switched optical network (ASON) (02/2005), the contents of which are herein incorporated by reference; Generalized Multi-Protocol Label Switching (GMPLS) Architecture as defined in Request for Comments (RFC): 3945 (10/2004) and the like, the contents of which are herein incorporated by reference; Optical Signaling and Routing Protocol (OSRP) which is an optical signaling and routing protocol similar to PNNI (Private Network-to-Network Interface) and MPLS; or any other type control plane for controlling network elements at multiple layers, and establishing and maintaining connections between nodes. Those of ordinary skill in the art will recognize the network 10 and the control plane 16 can utilize any type of control plane for controlling the nodes 12 and establishing, maintaining, and restoring calls or services between the nodes 12.

A Software Defined Networking (SDN) controller 18 can also be communicatively coupled to the network 10 through one or more of the nodes 12. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 18 knowing a full network topology through configuration or through the use of a controller-based discovery process in the network 10. The SDN controller 18 differs from a management system in that it controls the forwarding behavior of the nodes 12 only, and performs control in real time or near real time, reacting to changes in services requested, network traffic analysis and network changes such as failure and degradation. Also, the SDN controller 18 provides a standard northbound interface to allow applications to access network resource information and policy-limited control over network behavior or treatment of application traffic. The SDN controller 18 sends commands to each of the nodes 12 to control matching of data flows received and actions to be taken, including any manipulation of packet contents and forwarding to specified egress ports. Examples of SDN include OpenFlow (www.opennetworking.org), General Switch Management Protocol (GSMP) defined in RFC 3294 (June 2002), and Forwarding and Control Element Separation (ForCES) defined in RFC 5810 (March 2010), the contents of all are incorporated by reference herein.

Note, the network 10 can use the control plane 16 separately from the SDN controller 18. Conversely, the network 10 can use the SDN controller 18 separately from the control plane 16. Also, the control plane 16 can operate in a hybrid control mode with the SDN controller 18. In this scheme, for example, the SDN controller 18 does not necessarily have a complete view of the network 10. Here, the control plane 16 can be used to manage services in conjunction with the SDN controller 18. The SDN controller 18 can work in conjunction with the control plane 16 in the sense that the SDN controller 18 can make the routing decisions and utilize the control plane 16 for signaling thereof. In the terminology of ASON and OSRP, SNCs are end-to-end signaled paths or calls since from the point of view of a client signal; each is a single network segment. In GMPLS, the connections are an end-to-end path referred to as LSPs. In SDN, such as in OpenFlow, services are called "flows." In the various descriptions herein, reference is made to SNC or SNCP for illustration only of an exemplary embodiment of the systems and methods. Those of ordinary skill in the art will recognize that SNCs, LSPs, flows, or any other managed service in the network can be used with the systems and methods described herein for end-to-end paths. Also, as described herein, the term services is used for generally describing connections such as SNCs, LSPs, flows, etc. in the network 10.

Exemplary Network Element/Node

Referring to FIG. 2, in an exemplary embodiment, a block diagram illustrates an exemplary node 30 for use with the systems and methods described herein. In an exemplary embodiment, the exemplary node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another exemplary embodiment, the node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a Wavelength Division Multiplexing (WDM) terminal, an access/aggregation device, etc. That is, the node 30 can be any digital system with ingress and egress digital signals and switching of channels, timeslots, tributary units, etc. While the node 30 is generally shown as an optical network element, the systems and methods contemplated for use with any switching fabric, network element, or network based thereon.

In an exemplary embodiment, the node 30 includes common equipment 32, one or more line modules 34, and one or more switch modules 36. The common equipment 32 can include power; a control module; operations, administration, maintenance, and provisioning (OAM&P) access; user interface ports; and the like. The common equipment 32 can connect to a management system 38 through a data communication network 40 (as well as a Path Computation Element (PCE), SDN controller, OpenFlow controller, etc.). The management system 38 can include a network management system (NMS), element management system (EMS), or the like. Additionally, the common equipment 32 can include a control plane processor, such as a controller 50 illustrated in FIG. 3 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical or electrical connectors, or the like. The line modules 34 are configured to provide ingress and egress to the switch modules 36 and to external connections on the links to/from the node 30. In an exemplary embodiment, the line modules 34 can form ingress and egress switches with the switch modules 36 as center stage switches for a three-stage switch, e.g. a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between as well as future higher rates. The line modules 34 can include wavelength division multiplexing interfaces, short reach interfaces, and the like, and can connect to other line modules 34 on remote network elements, end clients, edge routers, and the like, e.g. forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an exemplary type of network element. For example, in another exemplary embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element providing switching of channels, timeslots, tributary units, wavelengths, etc. and using the control plane. Furthermore, the node 30 is merely presented as one exemplary node 30 for the systems and methods described herein.

Exemplary Controller

Figure 3:
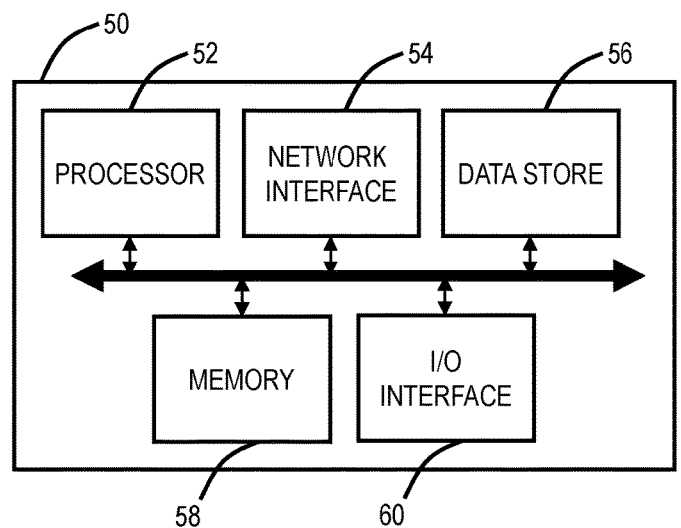
FIG. 3 is a block diagram of a controller to provide control plane processing and/or operations, administration, maintenance, and provisioning (OAM&P) for the node of FIG. 2, and/or to implement a Software Defined Networking (SDN) controller, in the network of FIG. 1.

Referring to FIG. 3, in an exemplary embodiment, a block diagram illustrates a controller 50 to provide control plane processing and/or operations, administration, maintenance, and provisioning (OAM&P) for the node 30, and/or to implement a Software Defined Networking (SDN) controller. The controller 50 can be part of the common equipment, such as common equipment 32 in the node 30, or a stand-alone device communicatively coupled to the node 30 via the DCN 40. In a stand-alone configuration, the controller 50 can be an SDN controller, an NMS, a PCE, etc. The controller 50 can include a processor 52 which is a hardware device for executing software instructions such as operating the control plane. The processor 52 can be any custom made or commercially available processor, a central processing unit (CPU), an auxiliary processor among several processors associated with the controller 50, a semiconductor-based microprocessor (in the form of a microchip or chip set), or generally any device for executing software instructions. When the controller 50 is in operation, the processor 52 is configured to execute software stored within the memory, to communicate data to and from the memory, and to generally control operations of the controller 50 pursuant to the software instructions. The controller 50 can also include a network interface 54, a data store 56, memory 58, an I/O interface 60, and the like, all of which are communicatively coupled to one another and to the processor 52.

The network interface 54 can be used to enable the controller 50 to communicate on the DCN 40, such as to communicate control plane information to other controllers, to the management system 38, to the nodes 30, and the like. The network interface 54 can include, for example, an Ethernet card (e.g., 10BaseT, Fast Ethernet, Gigabit Ethernet) or a wireless local area network (WLAN) card (e.g., 802.11). The network interface 54 can include address, control, and/or data connections to enable appropriate communications on the network. The data store 56 can be used to store data, such as control plane information, provisioning data, OAM&P data, etc. The data store 56 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 56 can incorporate electronic, magnetic, optical, and/or other types of storage media. The memory 58 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 58 may incorporate electronic, magnetic, optical, and/or other types of storage media. Note that the memory 58 can have a distributed architecture, where various components are situated remotely from one another, but may be accessed by the processor 52. The I/O interface 60 includes components for the controller 50 to communicate with other devices. Further, the I/O interface 60 includes components for the controller 50 to communicate with the other nodes, such as using overhead associated with OTN signals.

In an exemplary embodiment, the controller 50 is configured to communicate with other controllers 50 in the network 10 to operate the control plane for control plane signaling. This communication may be either in-band or out-of-band. For SONET networks and similarly for SDH networks, the controllers 50 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 50 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. For example, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 50 is configured to operate the control plane 16 in the network 10. That is, the controller 50 is configured to implement software, processes, algorithms, etc. that control configurable features of the network 10, such as automating discovery of the nodes, capacity on the links, port availability on the nodes, connectivity between ports; dissemination of topology and bandwidth information between the nodes; path computation and creation for connections; network level protection and restoration; and the like. As part of these functions, the controller 50 can include a topology database that maintains the current topology of the network 10 based on control plane signaling (e.g., HELLO messages) and a connection database that maintains available bandwidth on the links 14 again based on the control plane signaling. Again, the control plane is a distributed control plane; thus, a plurality of the controllers 50 can act together to operate the control plane using the control plane signaling to maintain database synchronization. In source-based routing, the controller 50 at a source node for a connection is responsible for path computation and establishing by signaling other controllers 50 in the network 10, such as through a SETUP message. For example, the source node and its controller 50 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. which are generally a service. Path computation generally includes determining a path, i.e. traversing the links through the nodes from the originating node to the destination node based on a plurality of constraints such as administrative weights on the links, bandwidth availability on the links, etc.

Tandem Connection Monitoring (TCM)

The node 10 and/or the controller 50 can also be configured to process TCMs in the OTN overhead. TCM trails can be used in OTN for protection switching applications. OTN supports six levels of TCM trails (paths), referred to as TCM1, TCM2, TCM3, TCM4, TCM5, TCM6. TCMs operate in various modes of operation and provide different monitoring applications along an individual ODU trails, including segment protection, administrative domain monitoring, service monitoring, fault location, Quality of Service (QOS), delay and latency measurement, and adjacency discovery. Note, the different levels of TCMs do not interfere with one another and TCMs may be cascaded or nested on any particular ODU trail. TCMs are described in part in ITU-T Recommendation G.805 "Generic functional architecture of transport networks," (03/00), ITU-T Recommendation G.872 "Architecture of optical transport networks," (10/12), and ITU-T Recommendation G.709 "Interfaces for the optical transport network," (02/12), the contents of each are incorporated by reference.

A number of ITU-T Recommendations provide information regarding TCM definition and operations as described above. ITU-T Rec. G.805 deals with common architectural concepts of transport networks including tandem connection monitoring. It defines a tandem connection as an arbitrary series of contiguous "link connections" and/or "subnetwork connections" which represents the part of a trail that requires monitoring independently from the monitoring of the complete trail. It also defines the functions required for tandem connection monitoring. These functions include (but are not limited to): Monitoring functions for the tandem connection that are independent of defects and errors that occur upstream of the tandem connection (outside the tandem connection endpoints); Verification of tandem connection connectivity and continuity; Fault management of the tandem connection including detection and reporting of near-end and far-end failure/alarm conditions; and Performance management of the tandem connection including detection and reporting of near-end and far-end error performance G.805 also defines several applications for tandem connection monitoring based on the concept of a monitoring domain. Three general tandem connection domain applications are identified. First, a protected domain is a domain where tandem connection monitors are used to monitor the status (failure state and error performance) of working and protection connections for the purposes of controlling protection switching operations. Second, a Serving operator administrative domain is a domain where a tandem connection monitor is used by a service provider (e.g., carrier or carrier's carrier) to monitor the status (failure state and error performance) of a connection delivered to a customer (e.g., an end customer or another carrier). Third, a Service requesting administrative domain is a domain where a tandem connection monitor is used by a customer to monitor the status (failure state and error performance) of a connection received from a service provider.

ITU-T Rec. G.872 extends the architectural concepts provided by Rec. G.805 that is applicable to optical transport networks. It discusses architectural concepts of optical channel connection monitoring including tandem connection monitoring. ITU-T Rec. G.872 discusses the concept of nested connections up to the maximum number of levels defined by the requirements of the specific technology (e.g., ITU-T Recommendation G.709). It notes that the number of connection monitoring levels that can be used by each operator/user involved in an optical channel connection must be negotiated by the parties involved. It also provides an example of a typical optical channel connection with five levels of nested connection monitoring.

Figure 4:
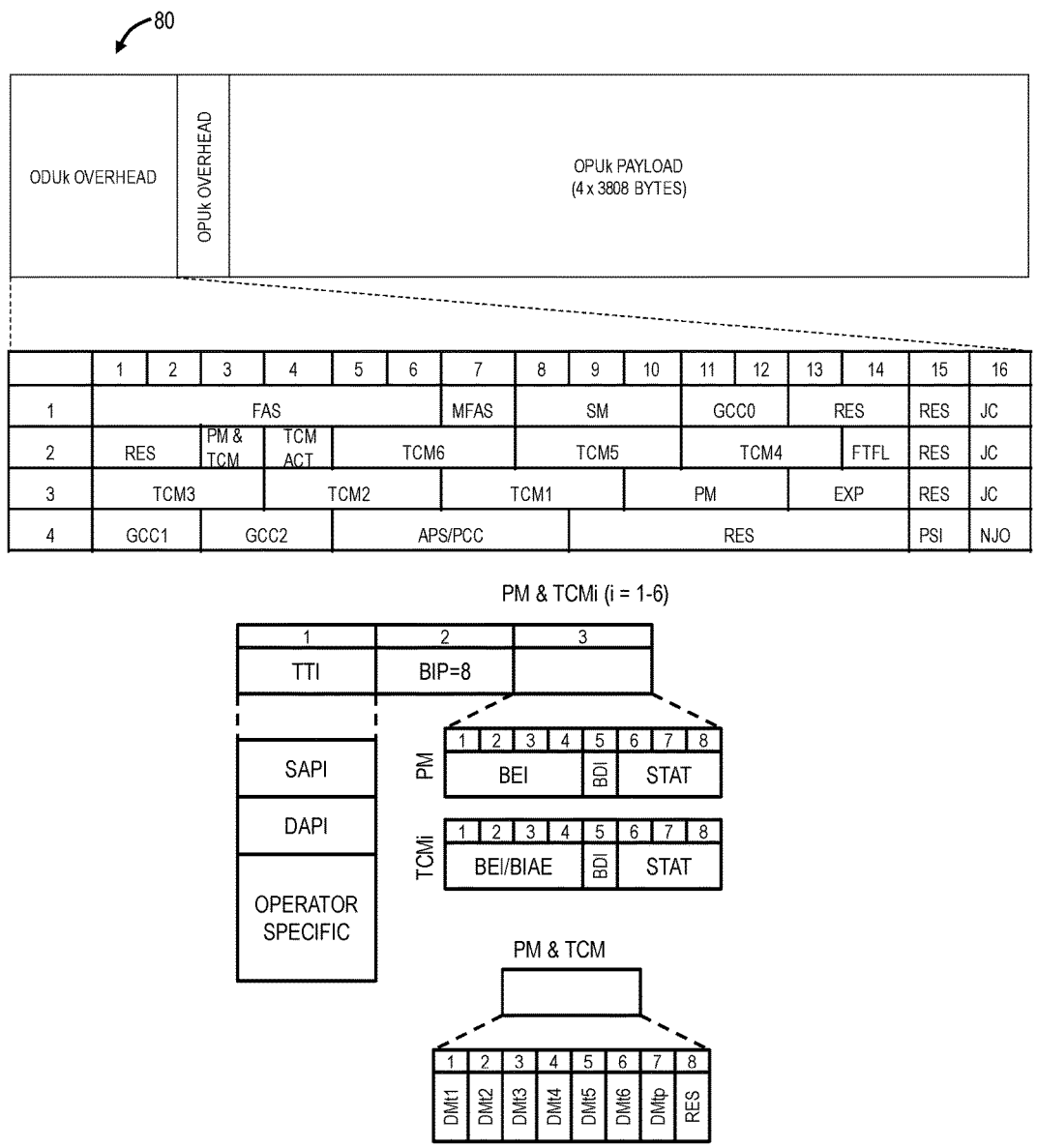
FIG. 4 is a block diagram of G.709 overhead.

Referring to FIG. 4, in an exemplary embodiment, a block diagram illustrates G.709 overhead 80. ITU-T Rec. G.709 defines the overhead required to support tandem connection monitoring for the OTN. This includes all TCM bit and byte assignments within the OTN frame structure and the definition of the functions of those bits and bytes. G.709 specifies that OTN provides six fields or levels of ODUk TCM (referred to as TCM1, TCM2, TCM3, TCM 4, TCM5, and TCM6) and the number of active TCM levels along an ODUk trail may vary between 0 and 6. At domain interfaces, G.709 specifies that the provisioning of the maximum number of levels which will be passed through the domain is possible (default of three levels). These tandem connections should use the lower levels (i.e. TCM1, TCM2 or TCM3). Levels beyond the maximum may/will be overwritten in the domain.

The G.709 overhead 80 is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the G.709 overhead 80 includes Forward Error Correction (FEC) data (not shown) in the frame. The OTU frame alignment bytes include a frame alignment signal (FAS) bytes and a multi-frame alignment signal (MFAS). Also, the G.709 overhead 80 includes section monitoring (SM) bytes and path monitoring (PM) bytes to provide optical layer error management between optical section and path in G.709. The SM bytes include dedicated bit-interleaved parity (BIP-8) monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI, which is similar to path trace in SONET.

A general communication channel 0 (GCC0) bytes provide a communications channel between adjacent G.709 nodes. The G.709 overhead 80 further includes a payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal is slightly higher than the OPU rate, NJO and PJO bytes may be replaced with signal information, i.e. the OPU payload capacity is increased slightly to accommodate the extra traffic on the transceiver, and the JC bytes reflect whether NJO and PJO are data or stuff bytes the JC bytes are used at the off-ramp to correctly de-map the signal. The PSI provides an identification of the payload signal. Further, the G.709 overhead 80 also includes six levels of Tandem Connection Monitoring (TCMn).

G.709 specifies that the TCM functions for monitored connections may be nested, cascaded or both. Overlapping of TCM functions is an additional configuration supported for testing purposes only but must be operated in a non-intrusive mode where maintenance signals are not generated. G.709 also describes the network applications supported by the ODUk TCM functions and references [ITU-T G.805] and [ITU-T G.872]. The applications referenced are the service requesting administrative domain (called optical UNI-to-UNI (user-network interface) tandem connection monitoring), service operator administrative domain (called optical NNI-to-NNI (network-network interface) tandem connection monitoring), and protected domain (linear protection, shared ring protection, and automatic restoration) applications. In addition, G.709 identifies the use of TCM functions to support fault localization and service maintenance functions.

ITU-T Rec. G.798 provides the modeling of the OTN equipment functional blocks including the TCM functions. The definition of the TCM processing includes defect detection and generation, defect correlation, consequent actions (e.g., maintenance signal generation), and performance monitoring functions. G.798 also provides an appendix with examples of TCM applications. G.798 models TCM functions through separate termination, adaptation, and control elements. The termination and adaptation elements are further sub-divided into separate unidirectional components dedicated to TCM source and sink operations. The termination elements deal mainly with the generation and insertion of TCM overhead bits/bytes at the source end of a tandem connection, and extraction and processing of the TCM overhead bits/bytes at the sink end of a tandem connection. The adaptation elements deal mainly with the layer-to-layer processing required at the source and sink ends of a tandem connection (e.g., detection of incoming alignment errors or insertion of maintenance signals).

ITU-T Rec. G.798.1 provides an example of assigned TCM levels within a network and describes the maintenance signal interactions (e.g., alarm indication signal (AIS) propagation) between tandem connections that are concatenated in the same sublayer and between tandem connections that are at different sublayers. ITU-T Rec. G.7710 provides information related to management of TCM functions (configuration, fault, performance, etc.) including TCM activation. One of the aspects of activation that Rec. G.7710 covers is the activation of a TCM for different nesting scenarios. These include activating a TCM that is nested within one or more other TCM levels, activating a TCM that has one or more existing TCM levels nested within it, and activating a TCM that is a combination of the previous two cases. This document specifies that two activation behaviors are possible from a network element perspective: TCM levels can be allocated flexibly, that is, in any order; and TCM levels cannot be allocated flexibly, that is, they require a fixed ordering. The first case requires only that the TCM be activated at the correct location with respect to any existing TCM levels. The second case may require that existing TCM levels be rearranged in order to support a new TCM level.

ITU-T Rec. G.7714.1 describes the methods, procedures and transport plane mechanisms for discovering layer adjacency for automatically switched optical networks (ASON). Section 6 of G.7714.1 points out the use of the TTI field of TCM level 6 as the default mechanism for carrying layer adjacency discovery messages. ITU-T Recs. G.873.1 and G.873.2 define the automatic protection switching (APS) protocol and protection switching operation for OTN linear and ring protection schemes at the ODUk level. One of the key schemes provided in G.873.1 and G.873.2 is ODUk subnetwork connection protection with sublayer monitoring (SNC/S). In this case protection switching is triggered by signal fail or signal degrade defects detected at the ODUkT sublayer trail (TCM). An ODUkT sublayer trail is established for each working and protection entity. Protection switching is triggered only on defects of the protected domain. The Recommendations point out that care has to be taken to make sure that there are no overlapping domains of use of a TCM level (i.e. TCM levels should only be used in nested or concatenated modes). Rec. G.873.2 also suggests the use of TCM level 6 for monitoring an ODUk connection which is supported by two or more concatenated ODUk link connections (supported by back-to-back OTUk trails). G.873.2 specifies an ODU SRP-1 protection application which uses the TCM6 field to monitor the status/performance of the ODU connection between two adjacent ODU SRP-1 nodes.

ITU-T Rec. G.798 defines three modes for TCM: an Operational mode, a Transparent mode, and a Monitoring mode. In the Operational mode, the TCM information is extracted from the TCM field and used to trigger actions such as alarm generation, switching action, etc. In the Transparent mode, the TCM information is passed through without change (i.e., transparently) and no processing is performed. In the Monitoring mode, TCM information is processed to recover defects and status information but is still passed through unchanged to succeeding nodes.

Again, TCMs are described herein with reference to OTN, but those of ordinary skill in the art will recognize TCMs are available in other protocols such as SONET, SDH, Ethernet, Constant Bit Rate (CBR), etc. The systems and methods for path protection switching due to client protection switching contemplate use in any protocol supporting TCM monitoring to obviate sympathetic switching therein.

TCM for Protection Switching—SNCP

Figure 5:
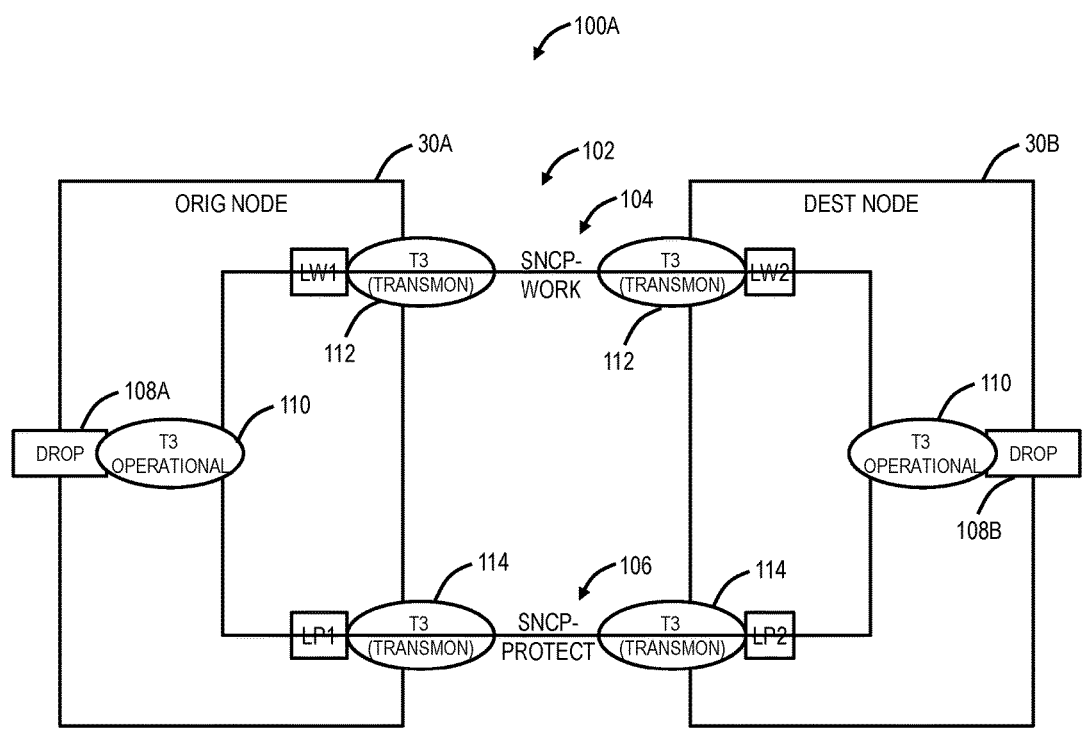
FIG. 5 is a network diagram of a network with two nodes supporting an SNCP.

Referring to FIG. 5, in an exemplary embodiment, a network diagram illustrates a network 100A with two nodes 30A, 30B supporting an SNCP 102. The SNCP 102 includes a work line 104 and a protect line 106. The node 30A can be the originating node with a drop port 108A, and the node 30B can be the destination node with a drop port 108B. The work line 104 can be formed by two ports LW1, LW2 with the port LW1 at the node 30A and the port LW2 at the node 30B (where LW stands for Line-working). The protect line 106 can be formed by two ports LP1, LP2 with the port LP1 at the node 30A and the port LP2 at the node 30B (where LP stands for Line-protect). The SNCP 102 can have any number of intermediate nodes between the nodes 30A, 30B (not shown for illustration purposes).

For conventional monitoring, three TCM entities 110, 112, 114 are created on each of the nodes 30A, 30B each, for SNCP switching to work between the lines 102, 104. On the originating node 30A, a TCM layer (e.g., TCM3) or entity 110 is created in an OPERATIONAL mode on the drop port 108A which essentially originates the TCM bytes towards a switch fabric. A TransMonitor Mode TCM (e.g., the same layer, TCM3) or entities 112, 114 is created on the Line side ports LW1, LP1, which passively monitors the defects coming into the node 30A on the SNCP path. If this TransMonitor detects a defect on the work line 104, it initiates a protection switch to the protect SNCP path, the protect line 106.

The idea behind this configuration is that any problem between the nodes 30A, 30B of the SNCP protected path, would result in a TCM3 defect that would be detected by the Transmonitor TCM entities 112, 114. However, any network problems outside of the SNCP 102 would not impact the TCM3 bytes in any way. Hence, any problems outside of the SNCP 102 would not initiate a protection switch, which would anyway have been a futile protection switch.

TCM for Protection Switching—APS Protected SNCP

Figure 6:
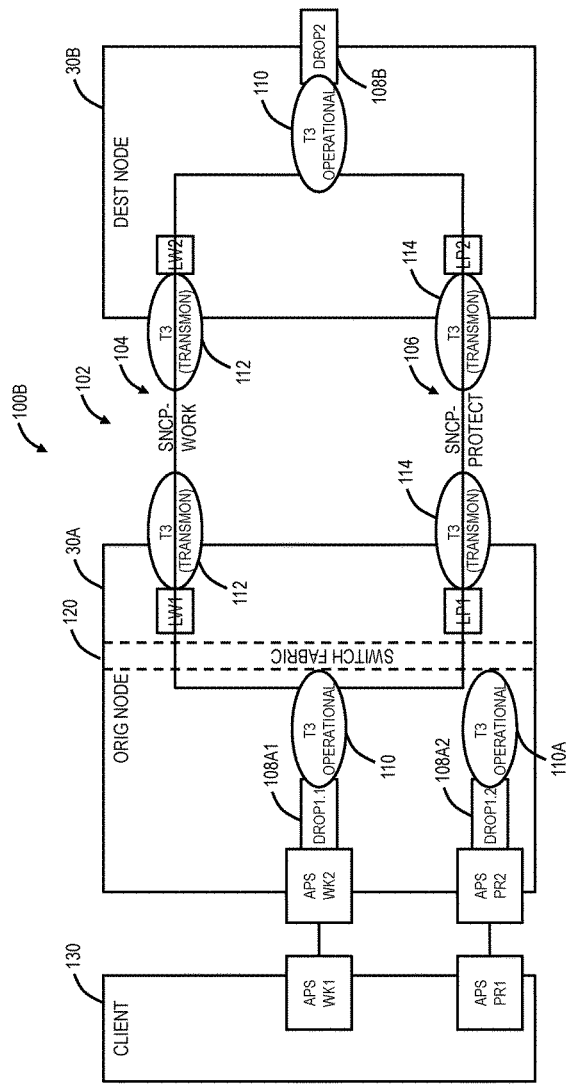
FIG. 6 is a network diagram of a network with two nodes supporting an SNCP with client APS protection to illustrate a sympathetic switch.

Referring to FIG. 6, in an exemplary embodiment, a network diagram illustrates a network 100B with two nodes 30A, 30B supporting an SNCP 102 with client APS protection to illustrate a sympathetic switch. The network 100B has a similar configuration as the network 100A with the node 30A supporting APS client protection of the SNCP 102. Specifically, the node 30A includes a switch fabric 120 which is configured to take signals from drop ports 108A1, 108A2 which are APS client protected and provide with the line ports LW1, LP1. The drop ports 108A1, 108A2 respectively connect to APS client ports APS WK2, APS PR2, which is connected to a client device 130 with corresponding APS client ports APS WK1, APS PR1. Thus, the client device 130 and the node 30A support client APS protection facilities between one another. Thus, while traffic on the drop ports 108A1, 108A2 is APS protected, the path itself between the nodes 30A, 30B is SNCP 102 protected. The drop port 108A2 also includes a TCM layer (e.g., TCM3) or entity 110A is created in an OPERATIONAL mode which essentially originates the TCM bytes towards the switch fabric 120. Note, Connection Termination Points (CTP) and the OPERATIONAL TCMs 110, 110A end points are pre-created in the case of 1+1 protection while these are dynamically created in the case of 1:N. As described herein, the systems and methods address problems associated in both cases (1+1, 1:N) where there can be a sympathetic switch on the SNCP 102 when the client-side APS switches.

For describing the sympathetic switch, consider traffic being routed via the APS WK2 line on the drop port 108A1. Now, assume there is an APS protection switch to the APS PR2 line on the drop port 108A2, i.e., APS protection occurs and a selector is moved to the APS PR2 line. In this process, the traffic connections in the switch fabric 120 which were originally programmed as Drop port 108A1←→LW1 to Drop port 108A2←→LW1. This causes a glitch in the traffic flowing from the drop ports 108A1, 108A2 to the line port LW1.

Since the TCM Bytes are originated on the drop port 108A1 OPERATIONAL TCM entity 110 are switched to the drop port 108A2 OPERATIONAL TCM entity 110A, these bytes are also corrupted briefly. The repercussion of this corruption can be seen at the far end (the node 30B) in the form of TCM defects. These defects will cause the SNCP 102 at the node 30B to infer that a problem has occurred in the SNCP 102 span, and it will initiate an SNCP Protection Switch in addition to APS Protection. This is referred to as sympathetic switching. This problem is aggravated in the case of 1:N Line protection where the TCM entity 110A on the protect line is created when APS switching is initiated. Note, the network 100B is 1:1, but a 1:N would have more than one work line WK1 sharing the protect line PR1. This can take tens of milliseconds to configure. All this while the remote SNCP TCM3 will continue to receive TCM3 defects. Again, the conventional approach to handling this is a hold-off timer which causes switches to be more than 100 ms and is unacceptable since the very purpose of these protection schemes is sub-50 ms restoration. The very purpose of segregating the sympathetic switches was to have separate TCM spans for each protection application, but this does not help in the case of Line protected drop ports.

TCM for Protection Switching—APS Protected SNCP Avoiding Sympathetic Switching

Figure 7:
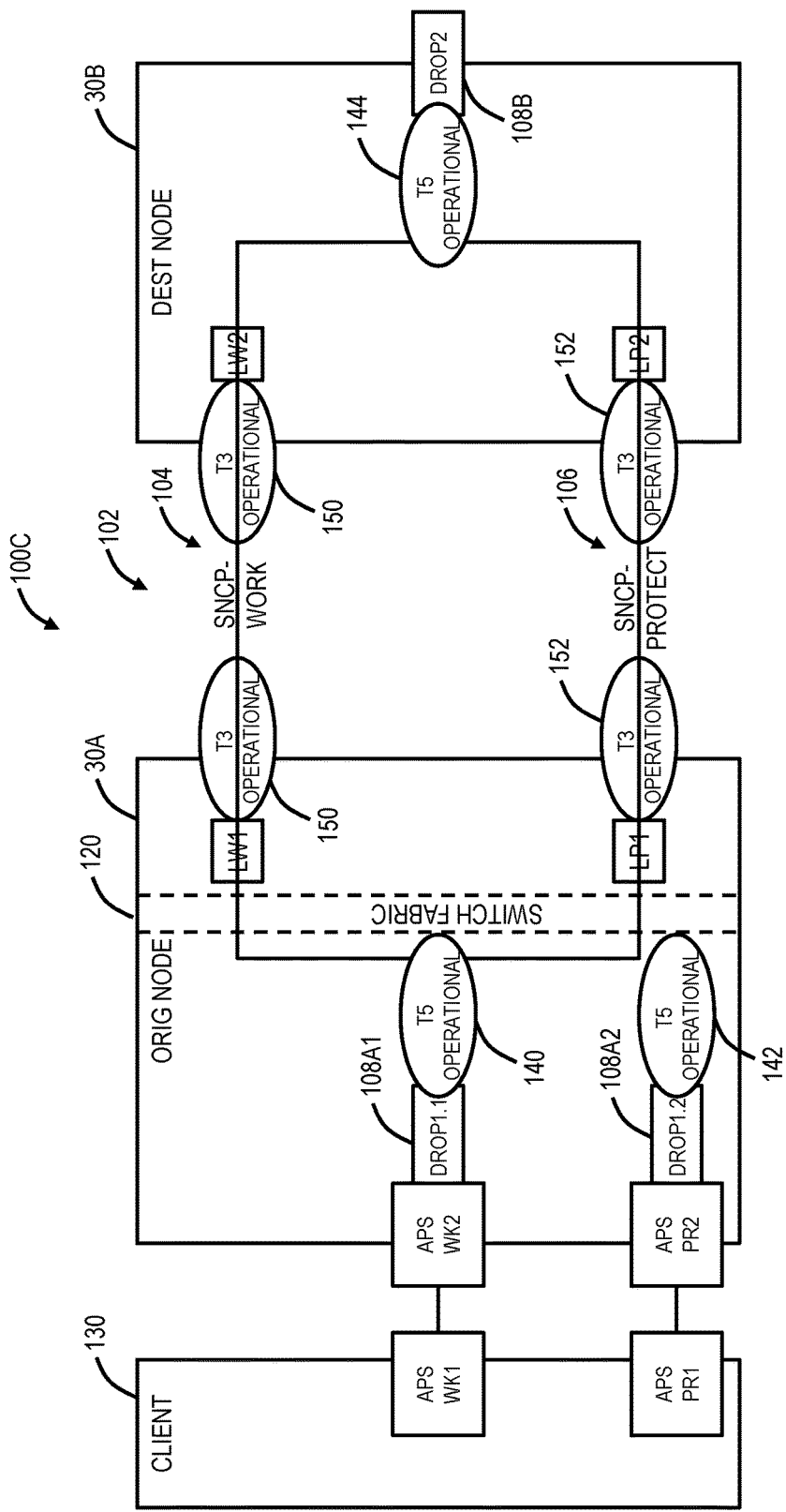
FIG. 7 is a network diagram of a network with two nodes supporting an SNCP with client APS protection to avoid a sympathetic switch.

Referring to FIG. 7, in an exemplary embodiment, a network diagram illustrates a network 100C with two nodes 30A, 30B supporting an SNCP 102 with client APS protection to avoid a sympathetic switch. The network 100C has a similar configuration as the network 100B with the node 30A supporting APS client protection of the SNCP 102. However, the network 100C includes a different TCM monitoring configuration using two separate TCM layers and associated logic to overcome the sympathetic switch problem described herein. For example, here, TCM entities 140, 142, 144 such as TCM5, are OPERATIONAL and originated at the drop ports 108A1, 108A2, 108B while TCM entities 150, 152 are OPERATIONAL and originated at the line ports LW1, LW2, LP1, LP2. As described herein, the TCM entities 140, 142, 144 can be referred to as drop side TCMs monitoring drop side conditions while the TCM entities 150, 152 can be referred to as line side TCMs monitoring line side conditions. Note, the selection of TCM3 and TCM5 is shown merely for illustration purposes, and other TCMs could be used in various combinations.

With data from both the drop side TCMs and the line side TCMs, SNCP and APS events can be differentiated. For example, the following table illustrates all possible scenarios for the drop side TCMs and the line side TCMs and the associated inference and logic. Note, GOOD and BAD are represented to denote the presence of defects (BAD) or the absence of defects (GOOD) in the associated TCMs. Since there are two TCM levels, there are four possible cases, but actually, case #4 is impossible and cannot occur, i.e., the drop side TCM will always show defects when the line side TCM exhibits defects.

| Case | Drop side TCM | Line Side TCM | Inference |
|---|---|---|---|
| 1 | Good | Good | The line is Good. No action Required |
| 2 | Bad | Good | If condition persists (e.g., because of fabric faults), SNCP switch can protect traffic; and If condition is transitory in nature (e.g., due to client APS protection switch), do not switch |
| 3 | Bad | Bad | There is a problem in SNCP Span. Switch immediately. |
| 4 | Good | Bad | Not a possibility. |

Case #1 is normal operation without defects. Case #3 is indicative of a defect in the SNCP 102 and requires an immediate SNCP protection switch. Case #2 is meant to deal with and avoid the sympathetic switch. Specifically, if the drop side TCM is BAD, but the line side TCM is GOOD, this can be due to the client APS protection switch which as described herein can cause glitches in the TCM entities 140, 142, 144 as the node 30A switches between the drop ports 108A1, 108A2. If the case #2 is transitory, such as less than 10 ms, there is not an SNCP protection switch thus avoiding the sympathetic switch. However, if case #2 persists, such as due to defects or faults in the switch fabric 120, there can be an SNCP protection switch. With this approach, the node 30A, the control plane, the controller 50, etc. is able to distinguish between case #2 and case #3. This helps in dynamically adapting by affecting an immediate switch if path faults are seen due to core path network issues (case #3), or by soaking TCM glitches seen due to client protection switching (case #2). Again, line protection switching is expected to switch within 50 ms but the time for switch programming could be in tens of milliseconds. The duration when the condition can be considered transitionary is proposed to be 10 ms.

In operation, the control plane 16 could send the dual TCM configuration in path protection attributes in associated control plane SETUP messages. The control plane 16 can use this at the nodes 30A, 30B for setting up OPERATIONAL TCM entities 140, 142, 144, 150, 152 on both the originating and terminating switch fabrics 120 and also on the line fiber facing objects, i.e., the line ports LW1, LW2, LP1, LP2 and the drop ports 108A1, 108A2, 108B.

Also, those of ordinary skill in the art will recognize while described herein with reference to 1+1/1:1 configurations, the same dual TCM configurations can be used in 1:N where the same level of TCM is set up for multiple drop ports.

Process for Avoiding Sympathetic Switches in OTN

Figure 8:
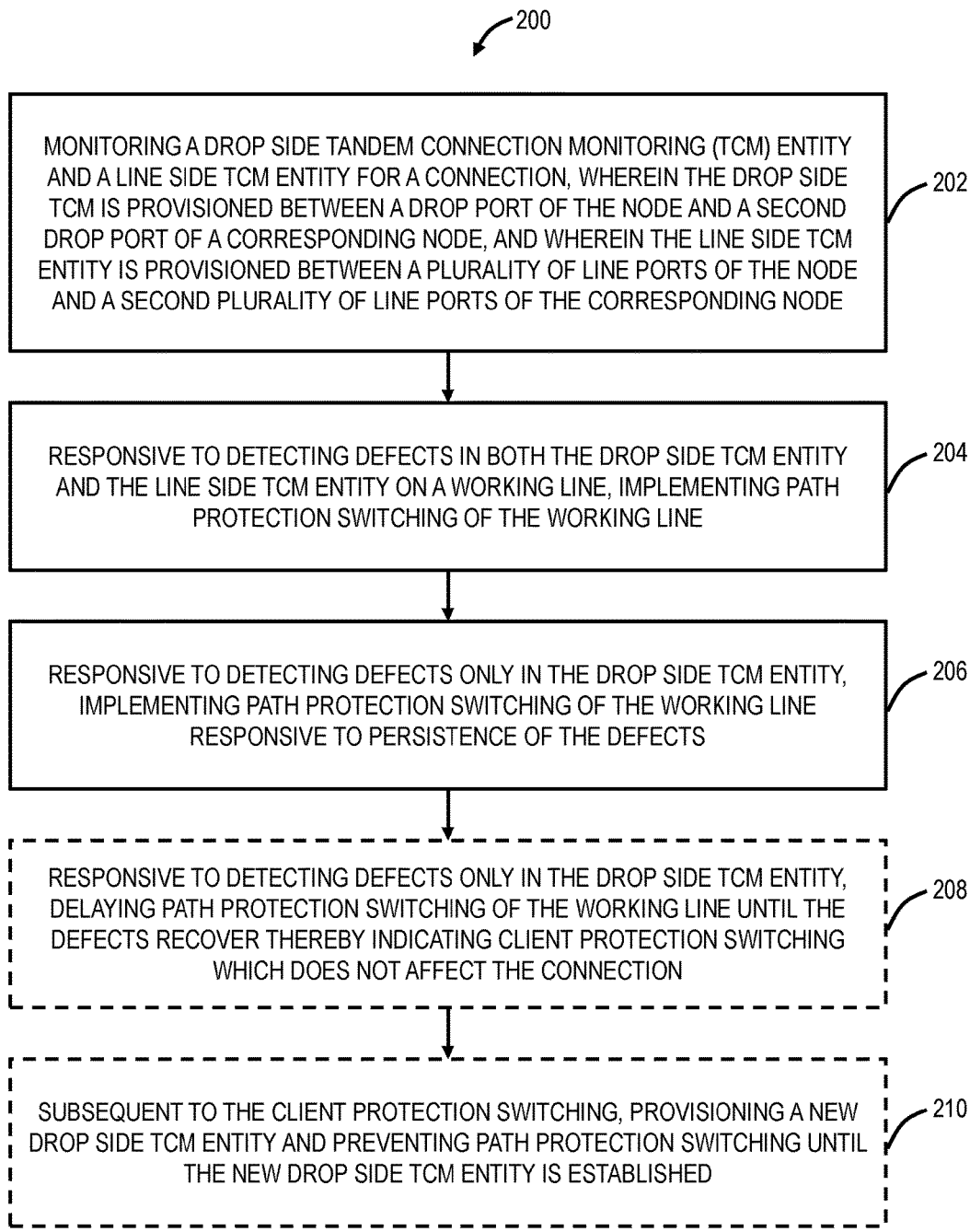
FIG. 8 is a flowchart of a process, such as implemented in the node of FIG. 2 in the network of FIG. 7, for avoiding sympathetic switches in path switching protection due to client protection switching in Optical Transport Network (OTN).

Referring to FIG. 8, in an exemplary embodiment, a flowchart illustrates a process 200, implemented in a node 30A in a network 100C, for avoiding sympathetic switches in path switching protection due to client protection switching in Optical Transport Network (OTN). The process 200 includes monitoring a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node (step 202). The process 200 further includes, responsive to detecting defects in both the drop side TCM entity and the line side TCM entity on a working line, implementing path protection switching of the working line (step 204); and, responsive to detecting defects only in the drop side TCM entity, implementing path protection switching of the working line responsive to persistence of the defects (step 206).

The process 200 can include, responsive to detecting defects only in the drop side TCM entity, delaying path protection switching of the working line until the defects recover thereby indicating client protection switching which does not affect the connection (step 208). The process 200 can include, subsequent to the client protection switching, provisioning a new drop side TCM entity and preventing path protection switching until the new drop side TCM entity is established (step 210). The defects can be persistent after 10 ms. The drop side can include client protection switching via two client ports, and the line side can include path protection switching, and wherein the drop side TCM entity and the line side TCM entity differentiate between switching events. The path protection switching can include Subnetwork Connection Protection (SNCP). The drop side TCM entity and the line side TCM entity can be established via control plane messaging. The persistence of the defects only in the drop side TCM entity can indicate a switch fabric fault.

In another exemplary embodiment, an apparatus is disposed in a node 30A in a network 100C, to avoid sympathetic switches in path switching protection due to client protection switching in Optical Transport Network (OTN). The apparatus includes circuitry adapted to monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node; circuitry adapted to cause, responsive to detection of defects in both the drop side TCM entity and the line side TCM entity on a working line, path protection switching of the working line; and circuitry adapted to cause, responsive to detection of defects only in the drop side TCM entity, path protection switching of the working line responsive to persistence of the defects.

In a further exemplary embodiment, a node 30A in a network 100C adapted to avoid sympathetic switches in path switching protection due to client protection switching in Optical Transport Network (OTN) includes a plurality of ports communicatively coupled to a corresponding node; and a controller communicatively coupled to the plurality of ports and configured to monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node; responsive to detection of defects in both the drop side TCM entity and the line side TCM entity on a working line, cause path protection switching of the working line; and responsive to detecting detection of only in the drop side TCM entity, cause path protection switching of the working line responsive to the defects persisting.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented in a node in a network, for avoiding sympathetic switches in path switching protection due to client protection switching, the method comprising:
    monitoring a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node;
    responsive to detecting defects in both the drop side TCM entity and the line side TCM entity on a working line, implementing path protection switching of the working line; and
    responsive to detecting defects only in the drop side TCM entity, implementing path protection switching of the working line responsive to persistence of the defects for a time which is later than when both the drop side TCM entity and the line side TCM entity both have defects, a time which is later than a time required to avoid sympathetic switching, and a time that is less than a line protection switching time.

2. The method of claim 1, further comprising:
    responsive to detecting defects only in the drop side TCM entity, delaying path protection switching of the working line until the defects recover thereby indicating client protection switching which does not affect the connection.

3. The method of claim 1, further comprising:
    subsequent to the client protection switching, provisioning a new drop side TCM entity and preventing path protection switching until the new drop side TCM entity is established.

4. The method of claim 1, wherein the defects are persistent after 10 ms.

5. The method of claim 1, wherein the drop side comprises client protection switching via two client ports and the line side comprises path protection switching, and wherein the drop side TCM entity and the line side TCM entity differentiate between switching events.

6. The method of claim 1, wherein the path protection switching comprises Subnetwork Connection Protection (SNCP).

7. The method of claim 1, wherein the drop side TCM entity and the line side TCM entity are established via control plane messaging.

8. The method of claim 1, wherein the persistence of the defects only in the drop side TCM entity indicates a switch fabric fault.

9. An apparatus, disposed in a node in a network, to avoid sympathetic switches in path switching protection due to client protection switching in Optical Transport Network (OTN), the apparatus comprising:
    circuitry adapted to monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node;
    circuitry adapted to cause, responsive to detection of defects in both the drop side TCM entity and the line side TCM entity on a working line, path protection switching of the working line; and
    circuitry adapted to cause, responsive to detection of defects only in the drop side TCM entity, path protection switching of the working line responsive to persistence of the defects for a time which is later than when both the drop side TCM entity and the line side TCM entity both have defects, a time which is later than a time required to avoid sympathetic switching, and a time that is less than a line protection switching time.

10. The apparatus of claim 9, further comprising:
    circuitry adapted to delay, responsive to detecting defects only in the drop side TCM entity, path protection switching of the working line until the defects recover thereby indicating client protection switching which does not affect the connection.

11. The apparatus of claim 9, further comprising:
    circuitry adapted to provision, subsequent to the client protection switching, a new drop side TCM entity and prevent path protection switching until the new drop side TCM entity is established.

12. The apparatus of claim 9, wherein the defects are persistent after 10 ms.

13. The apparatus of claim 9, wherein the drop side comprises client protection switching via two client ports and the line side comprises path protection switching, and wherein the drop side TCM entity and the line side TCM entity differentiate between switching events.

14. The apparatus of claim 9, wherein the path protection switching comprises Subnetwork Connection Protection (SNCP).

15. The apparatus of claim 9, wherein the drop side TCM entity and the line side TCM entity are established via control plane messaging.

16. The apparatus of claim 9, wherein the persistence of the defects only in the drop side TCM entity indicates a switch fabric fault.

17. A node in a network adapted to avoid sympathetic switches in path switching protection due to client protection switching in Optical Transport Network (OTN), the node comprising:
- a plurality of ports communicatively coupled to a corresponding node; and
- a controller communicatively coupled to the plurality of ports and configured to
  - monitor a drop side Tandem Connection Monitoring (TCM) entity and a line side TCM entity for a connection, wherein the drop side TCM is provisioned between a drop port of the node and a second drop port of a corresponding node, and wherein the line side TCM entity is provisioned between a plurality of line ports of the node and a second plurality of line ports of the corresponding node,
  - responsive to detection of defects in both the drop side TCM entity and the line side TCM entity on a working line, cause path protection switching of the working line, and
  - responsive to detecting detection of only in the drop side TCM entity, cause path protection switching of the working line responsive to the defects persisting for a time which is later than when both the drop side TCM entity and the line side TCM entity both have defects, a time which is later than a time required to avoid sympathetic switching, and a time that is less than a line protection switching time.

18. The node of claim 17, wherein the controller is further configured to
- delay, responsive to detecting defects only in the drop side TCM entity, path protection switching of the working line until the defects recover thereby indicating client protection switching which does not affect the connection.

19. The node of claim 17, wherein the controller is further configured to
- provision, subsequent to the client protection switching, a new drop side TCM entity and prevent path protection switching until the new drop side TCM entity is established.

20. The node of claim 17, wherein the drop side comprises client protection switching via two client ports and the line side comprises path protection switching, and wherein the drop side TCM entity and the line side TCM entity differentiate between switching events.

* * * * *